United States Patent [19]

Chaumet-Lagrange

[11] Patent Number: 5,689,475
[45] Date of Patent: Nov. 18, 1997

[54] NAUTICAL APPARATUS TO CONDUCT RECONNAISSANCE MISSIONS OF A SITE, PARTICULARLY BATHYMETRIC SURVEYS

[75] Inventor: Marc Chaumet-Lagrange, Merignac, France

[73] Assignee: Port Autonome de Bordeaux, Bordeaux, France

[21] Appl. No.: 453,704

[22] Filed: Sep. 1, 1995

[30] Foreign Application Priority Data

May 30, 1994 [FR] France ................................. 94 06527

[51] Int. Cl.⁶ .................................................. G01S 15/89
[52] U.S. Cl. ............................................................ 367/88
[58] Field of Search ........................ 367/99, 12, 88, 367/104; 342/66, 357; 364/448; 441/21

[56] References Cited

U.S. PATENT DOCUMENTS

| | | | |
|---|---|---|---|
| 3,688,252 | 8/1972 | Thompson | 340/995 |
| 3,865,062 | 2/1975 | Babb | 114/259 |
| 3,922,632 | 11/1975 | Murphree | 367/96 |
| 4,680,148 | 7/1987 | Arbisi et al. | 441/21 |

FOREIGN PATENT DOCUMENTS 1372174  10/1974  United Kingdom.

*Primary Examiner*—Daniel T. Pihulic
*Attorney, Agent, or Firm*—Schweitzer Cornman Gross & Bondell LLP

[57] ABSTRACT

Nautical apparatus to conduct reconnaissance missions of a site, particularly bathymetric surveys.

A nautical apparatus to conduct reconnaissance missions of a site, particularly bathymetric surveys by means of sounding, comprising a floating hull, inside of which motor and directional elements, means of geographic localization of the apparatus, measurement instruments, and means for taking into account each measurement in association with the time of the survey and the geographic situation of the apparatus at the time of the survey.

It has a programmable automatic system comprising:
  a memory which can remember a route covering the site to be sounded,
  processing means which analyze the route recorded, taking into account the current position of the nautical apparatus, and prerecorded information relative to the site to be sounded, deducing from this piloting commands for the nautical apparatus (1),
  an interface connected on the one hand with the processing means, on the other hand with the motor and directional elements of the apparatus, which are capable of maneuvering the latter as a function of piloting commands issued from the processing means.

8 Claims, 4 Drawing Sheets

NAUTICAL APPARATUS TO CONDUCT RECONNAISSANCE MISSIONS OF A SITE, PARTICULARLY BATHYMETRIC SURVEYS

BACKGROUND OF THE INVENTION

The present invention relates to a nautical apparatus to conduct reconnaissance missions of a site, and particularly bathymetric surveys by means of hydrographic sounding, which can be used especially in port areas or coastal zones, or for inland bodies of water.

It is known that it is important to constantly survey the condition of underwater terrain, particularly in port areas, where any change in the underwater topography might represent a hazard for navigation and must therefore be completely known.

In particular, in estuary zones where sedimentation is significant, it is indispensable to detect any increase in the sediment level, in order to dredge the bottom of navigation channels on the basis of this information.

In general, to prepare an underwater map, soundings are taken using a specially equipped small scouting boat, with a team of about four people.

Such a vedette boat has a hydrographic sounding device which determines the level of water perpendicular to the craft, and a localization system which makes it possible to associate each depth determined with its position on the map which is being prepared.

The time of the survey is also taken into account, to eliminate the component connected with the tides (height of water measured relative to zero on the maps).

But this technique of bathymetric survey represents a significant financial cost for the maritime authority responsible for underwater terrain surveys.

Furthermore, the presence of a human team on board the boat means that strict safety measures have to be observed.

In particular, it is impossible to take soundings when the navigating conditions prove to be too dangerous.

Consequently, surveillance of underwater terrain is subject to chance, which can reduce its reliability and prevent optimum exploitation of the navigation zones in question.

SUMMARY OF THE PRESENT INVENTION

The present invention aims to provide a simple and economical apparatus which avoids the problems encountered with the known technique, particularly the problems of cost and safety as mentioned above.

The present invention has as its subject a nautical apparatus to conduct reconnaissance missions of a site, particularly bathymetric surveys by means of sounding, comprising a floating hull, inside of which motor and directional elements, means of geographic localization of the apparatus, instruments for measuring the depth of water present under the hull, for example, and means for taking into account each such measurement in association with the time of the survey and the geographic situation of the apparatus at the time of the survey, characterized by the fact that it has a programmable automatic system comprising:

a memory which can remember a route covering the site to be sounded, processing means which analyze the route recorded, taking into account the current position of the nautical apparatus, and prerecorded information relative to the site to be sounded, deducing from this piloting commands for the nautical apparatus, an interface connected on the one hand with the processing means, on the other hand with the motor and directional elements of the apparatus, which are capable of maneuvering the latter as a function of piloting commands issued from the processing means.

Since the programmable automatic system is capable of piloting the apparatus according to the invention in a completely autonomous manner, it is not necessary for a person to be on board the apparatus during a bathymetric survey.

Advantageously, the hull of the nautical apparatus according to the invention is non-submersible.

For this purpose, it is possible, for example, to use an inflatable dinghy with a rigid hull, which meets the requirement of non-submersibility, while being sufficiently resistant to shock. Furthermore, such a dinghy has a very low draft, which makes it possible to access any underwater zone, no matter how shallow.

Preferably, the motor element of the nautical apparatus according to the invention is a hydropropeller, which results in optimum reliability of operation, and protects the environment from disturbances which cause a conventional helix.

In accordance with the invention, the processing means analyze the rome as a function of prerecorded information relating to the site, which can be geographical data, indicating, for example, zones in which navigation is prohibited, the presence of shipwrecks, buoys, anchoring apparatus, registered fixed obstacles, or the maximum speed permitted at the site.

In a preferred embodiment of the invention, the nautical apparatus furthermore has environmental sensors which allow it to acquire information relating to the site, while also detecting any obstacles which present themselves on its path.

Such obstacles can be floating objects of any kind, such as small fishing boats or pleasure craft of the sailboard type, or larger vessels.

These can also be fixed obstacles, the presence of which is not indicated in the information relating to the site to be sounded which is prerecorded in the automatic system.

The environmental sensors which can be used for this purpose can be, on the one hand, a radar which detects large obstacles located several tens of meters from the nautical apparatus, and an infrared camera which, together with electronic equipment for image processing, can detect smaller obstacles located only several meters from the nautical apparatus according to the invention.

The presence of a camera can also serve for remote control of the nautical apparatus according to the invention from a piloting post located on land or on another vessel at a distance from the said nautical apparatus.

In this case, it is possible to use a video camera which transmits the images to a control station where the piloting post is located.

This method of operation can prove to be particularly useful in the case of complex maneuvers which require the abilities of an experienced sailor.

In a preferred embodiment of the invention, a programming device connected to the measurement instruments triggers taking of measurements at predetermined time intervals.

In a second embodiment of the invention, the programming device receives the measurements taken by the measurement instruments, either continuously or periodically, but at very frequent intervals. If the gap between a current measurement and the last measurement taken is greater than a predetermined limit, the programming device triggers taking of the current measurement, which then becomes the last measurement taken.

In this embodiment, the predetermined limit corresponds to the precision of the bathymetric survey.

In this way, intermediate measurements which are useless, in excess of what is needed and non-significant are avoided.

In a third embodiment of the invention, the programming device is connected to means of geographical localization of the apparatus, and triggers taking of measurements when the nautical apparatus is at a geographical point or in a geographical zone determined in advance.

The determination of these geographical points results from an a priori knowledge of the relief of the site to be sounded. For example, in zones which are a priori very rough, the density of points provided is much greater than in regions which are a priori essentially flat.

In a preferred embodiment of the invention, the route recorded in the memory of the programmable automatic system consists of a sequence of geographical points which the nautical apparatus must successively follow.

Because the route is cut into successive segments, the processing means of the automatic system can more easily determine the optimum path between the current position of the apparatus and the next point to be reached. Little by little, the nautical apparatus therefore faithfully follows the entire route determined in advance, covering the site to be sounded.

It is advantageous to divide the assigned points in such a manner as to sweep the entire surface of the site to be sounded, for example by dividing the zone into a grid of lines and columns.

In a preferred embodiment of the invention, the measurement instruments comprise an acoustical sounding device, mounted in a fixed position relative to the hull, a platform provided with inclinometers and accelerometers which constantly evaluate the roll, the pitch, and the differences in height of the nautical apparatus, as well as calculating means which take these parameters into account and correct the values provided by the sounding device as a function of them.

Thus, any measurement taken by the sounding device under perhaps difficult conditions can be considered, after correction, as having an error of only less than 0.20 m to 10 m, and beyond that a relative error less than or equal to 2%.

In order to limit the possible errors resulting from an overly great inclination of the nautical apparatus, in a preferred variant, the measurement instruments comprise means to exclude any measurements other than those taken by the sounding device within an imaginary cone with a vertical axis and an angle at the top of approximately 10 to 20 degrees, following the opening angle of the ultrasound emitter beam of the sounding device.

The nautical apparatus according to the invention can be used in combination with logistical means which allow it to be placed in the water, to be Controlled, if necessary, and to be recovered at the end of the mission.

Such logistical means can be comprised of another vessel or a terrestrial vehicle and can furthermore serve for several nautical apparatuses according to the invention, simultaneously conducting missions in different regions.

The measurements taken by the nautical apparatus can be recorded on a medium present in the nautical apparatus, or transmitted by logistical means which analyze and record the data received.

For the purpose of better understanding the invention, an embodiment will now be described as an example which does not limit the scope of the invention, with reference to the appended drawing, in which:

DETAILED DESCRIPTION OF THE INVENTION

Figure 2:
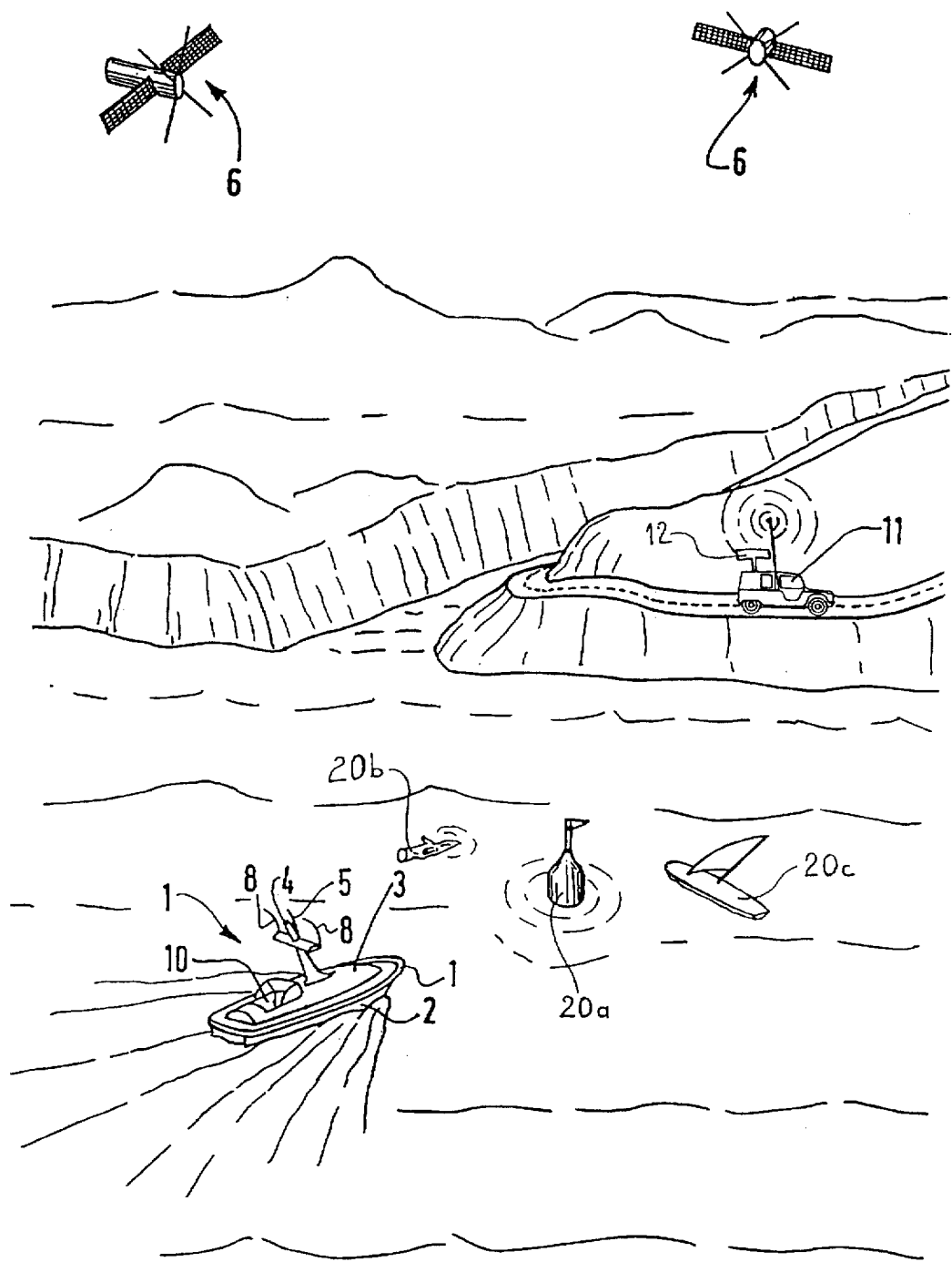
FIG. 2 is an overall view of a site on which the nautical apparatus of FIG. 1 is conducting a bathymetric survey.

In the overall view of FIG. 2, an estuary is shown, in the vicinity of which a nautical apparatus 1 according to the invention is conducting a mission.

Figure 1:
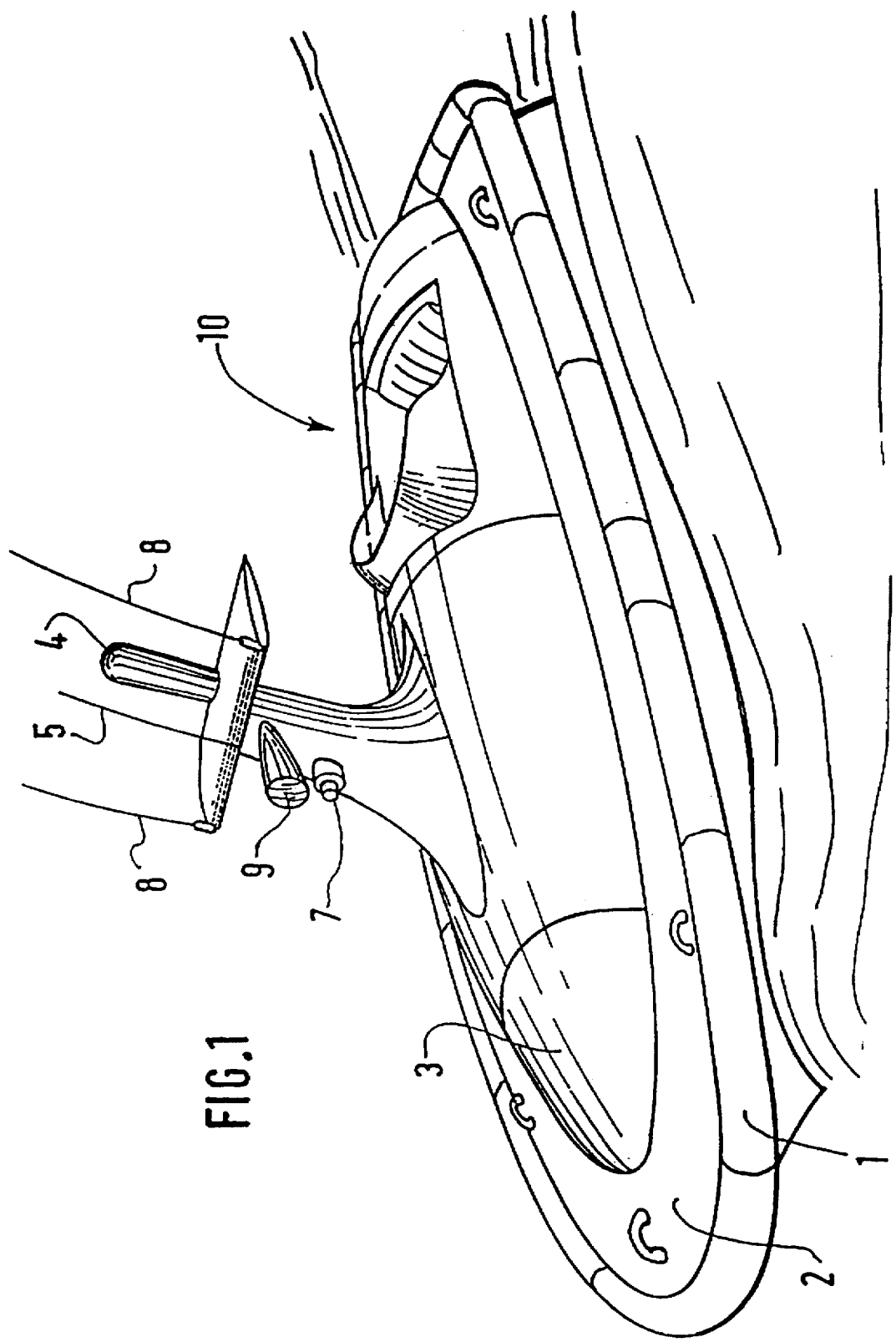
FIG. 1 represents a perspective view of a nautical apparatus according to the invention, according to a method of implementation of the invention.

As one can see in FIG. 1, the nautical apparatus 1 is comprised of an inflatable dinghy with a rigid hull 2 which is enclosed on the top by a water-proof cover 3 which keeps out ocean water and rain water.

A mast supports the antenna 4 of a radar responder, the double antenna 5 of a localization receiver of a positioning system of the type known under the name of Differential Global Positioning System (DGPS), which communicates with geostationary satellites 6, and with a differential positioning station located on the ground, a camera 7, two VHF and UHF radio antennas 8, and signals or signal fires 9.

A piloting post 10 is also provided to allow use of the nautical apparatus 1 in the manual mode.

On the shore, a road vehicle 11, which can communicate by radio with the nautical apparatus 1, supports the differential positioning station of the DGPS system, which also communicates with the satellites 6 and operates in relation to the localization receiver of the nautical apparatus and the antenna 12 of a radar which operates with the radar responder of the nautical apparatus.

In conformity with the invention, the hull 2 encloses measurement instruments, not shown, to measure the depth of the water under the hull 2, means for taking each measurement into account in association with the time of the survey and the geographical situation of the apparatus at the moment of the survey, and a programmable automatic system.

Figure 3:
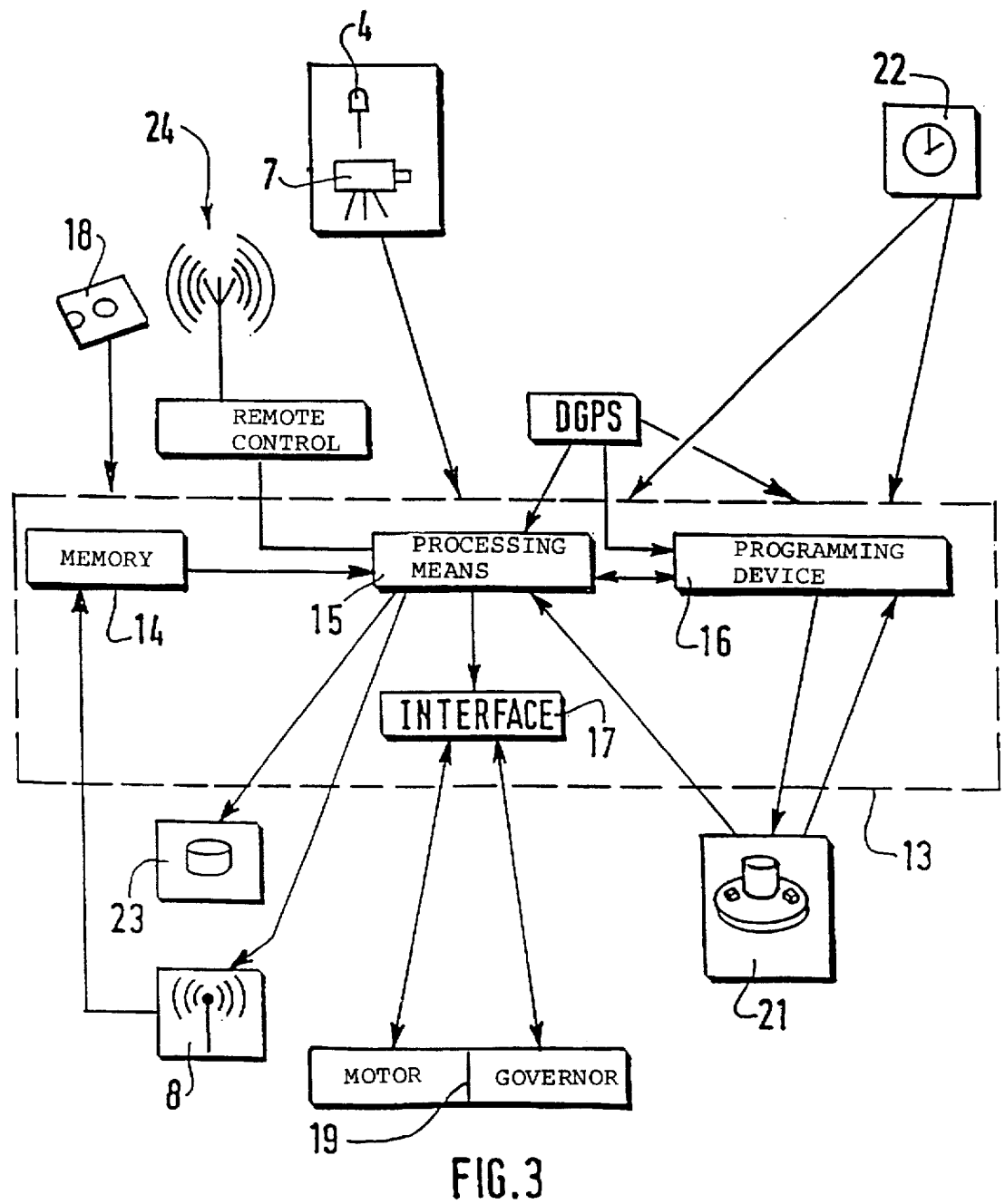
FIG. 3 is a block schematic of various functional parts of the nautical apparatus of FIG. 1.

FIG. 3 is a block schematic of various functional parts of the nautical apparatus of FIG. 1.

On the diagram, the antenna 4 of the radar responder, the camera 7, the DGPS positioning system and the antennas 8 can be found.

The part of this diagram corresponding to the programmable automatic system 13 is defined by a broken line.

The programmable automatic system comprises a memory 14, processing means 15, a programming device 16 and an interface 17.

In the memory 14, a user can put into memory a route to be followed by the nautical apparatus in order to cover a site to be sounded.

This route can be provided as numerical data recorded on a magnetic disk 18.

Such an entry into the memory 14 is preferably made at the beginning of the mission, before setting the nautical apparatus according to the invention free.

The memory 14 can also be loaded by remote control, using the antennas 8.

The route contained in the memory 14 is transmitted to the processing means 15, which determine the piloting commands to be sent to the interface 17 to control the movements of the nautical apparatus.

The interface 17 passes the commands on to the motor and to the governor 19, and in return receives status information which allow monitoring of the proper operation of this equipment.

To analyze the route to be followed, the processing means 15 use information provided by the DGPS positioning system, and by the environmental sensors which comprise the radar installed on the vehicle 11 and the infrared camera 7 mounted on the nautical apparatus 1.

The radar responder of the nautical apparatus makes it possible to locate relatively large obstacles, such as a buoy 20a, for example, on the radar of the vehicle 11, and relative to the nautical apparatus 1, while the infrared camera 7 makes it possible to detect the presence of smaller and closer obstacles, such as a tree trunk 20b, for example, or a sailboard 20c, as shown in FIG. 1.

Conventional image processing algorithms can be used to take advantage of the images provided by the camera 7.

The processing means 15 also take advantage of the data obtained from the DGPS positioning system.

Thus, the processing means 15 determine the piloting commands, with recourse to well-known decision-making algorithms, which can be implemented, for example, by an expert system.

The programming device 16 triggers taking of measurements provided by the measurement instruments 21 at predetermined time intervals, in conformity with the implementation method already described.

For this purpose, the programming device 16 is connected to a clock 22.

The measurement instruments 21 are connected with an accelerometric platform and to calculation means, not shown, which allow a correction of the measurements, taking into account the roll, the pitch and the variations in level of the nautical apparatus.

The programming device 16 can also receive precise geographical localization of the nautical apparatus from the DGPS positioning system. As a function of this information, the programming device 16 can modify the time interval in such a way as to trigger more frequent taking of measurements provided by the measurement instruments 21.

Simultaneous with their acquisition, the data issued by the measurement instruments 21 are recorded on a hard drive 23 or transmitted to the logistical means via the radio antennas 8.

A receiver 24 is also provided to allow remote control of the apparatus, for example from the vehicle 11, in case of a particularly delicate maneuver.

As already explained above, the definition of the route to be followed by the nautical apparatus can be given in the form of a sequence of geographical points 25 which the nautical apparatus 1 must successively follow, and on the rome of which the measurements are taken by the automatic system.

Figure 4:
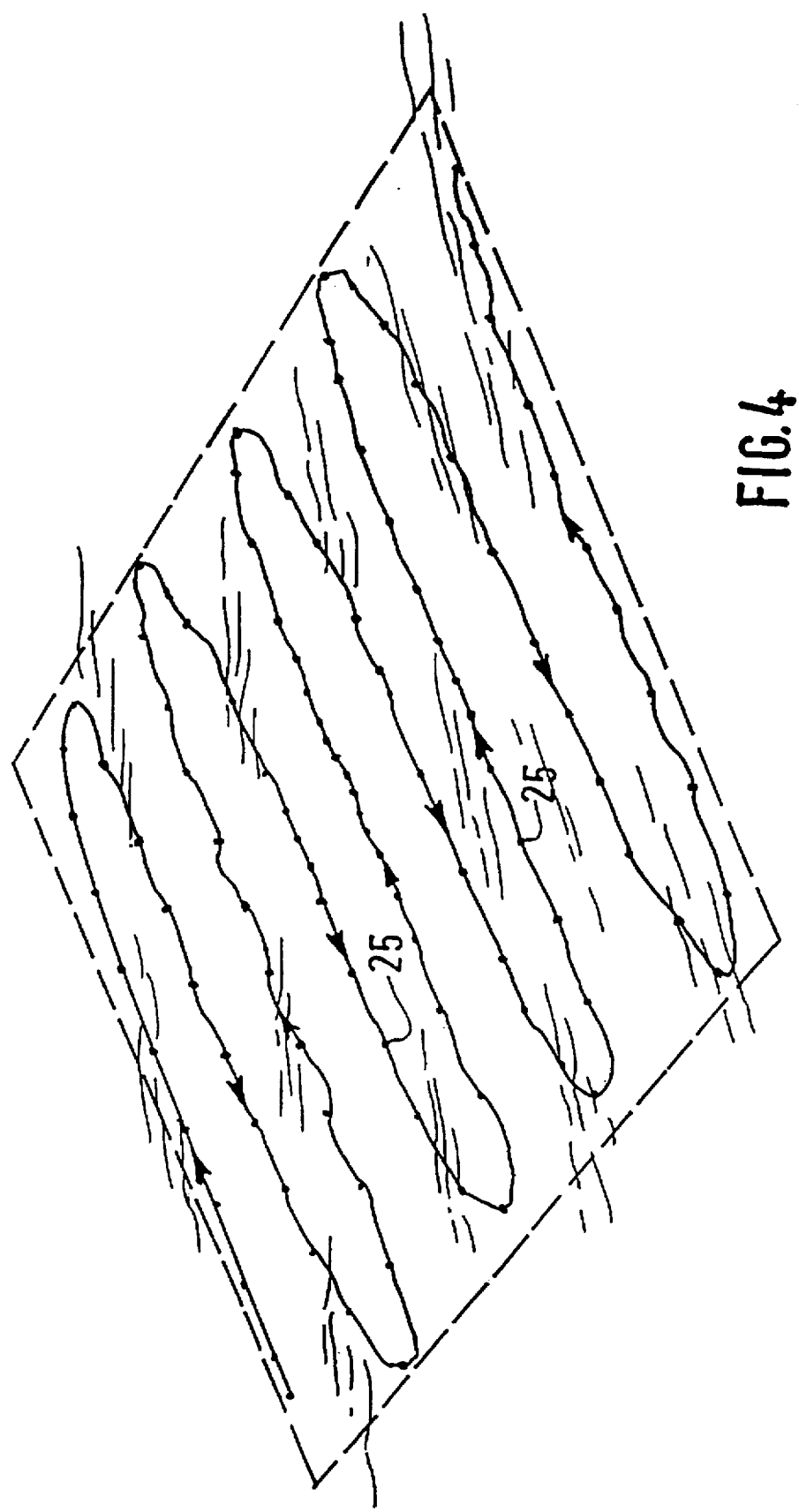
FIG. 4 is a representation of a route to be followed by the nautical apparatus of FIG. 1.

FIG. 4 represents such a path, cut into successive segments.

It is understood that the method of implementation which has just been described does not represent any limitation and that it can be modified in any desirable manner, without thereby leaving the scope of the invention.

I claim:

1. A nautical apparatus for conducting subsurface bathymetric surveys at a surface site by sounding techniques, said nautical apparatus including a buoyant hull housing a motor and directional elements (19), means of geographic localization of the nautical apparatus, measurement instruments, and computing means for analyzing measurements taken in association with the time of the survey and the geographic position of the apparatus at the time of the survey, characterized in that the nautical apparatus has a programmable automatic system (13) comprising:

(a) a memory means (14) for storing a route traversing the site (24) to be surveyed, (b) processing means (15) for making an analysis of the route recorded, considering the current position of the nautical apparatus, and prerecorded information relative to the site to be surveyed, and generating from the analysis made appropriate piloting commands for the nautical apparatus (1), and (c) an interface means (17) connected with said processing means (15), and with said motor and directional elements (19), which interface means (17) maneuvers the directional elements (15) as a function of piloting commands generated by the processing means (15).

2. Nautical apparatus pursuant to claim 1, characterized in that the measurement instruments (21) comprise an acoustical sounding device mounted in a fixed position relative to the hull, a platform provided with inclinometers and accelerometers which constantly evaluate the roll, the pitch, and the differences in height of the nautical apparatus, as well as calculating means which take these parameters into account and correct the values provided by the sounding device as a function of them.

3. Nautical apparatus pursuant to claim 1, characterized in that it has environmental sensors (4, 12, 7) which allow it to acquire information relating to the site (24), by detecting any obstacles (20) which present themselves on its path.

4. Nautical apparatus pursuant to claim 3, characterized in that the environmental sensors are a radar (4, 12) which detects large obstacles and a video camera which transmits its images to a monitoring station, or an infrared camera which, together with electronic equipment for image processing, can detect smaller obstacles (20).

5. Nautical apparatus pursuant to claim 1, characterized in that it comprises a programming device (16) connected with measurement instruments which trigger taking of measurements at predetermined time intervals.

6. Nautical apparatus pursuant to claim 1, characterized in that it comprises a programming device (16) connected with the measurement instruments, which constantly receives the measurements taken by the measurement instruments (21), and if the gap between a current measurement and the last measurement taken is greater than a predetermined limit, it triggers taking of the current value.

7. Nautical apparatus pursuant to claim 1, characterized in that it comprises a programming device (16) connected with the measurement instruments and with the geographical localization means (DGPS), which triggers taking of measurements when the nautical apparatus (1) is at the geographical points determined in advance.

8. Nautical apparatus pursuant to claim 1, characterized in that the route recorded in the memory (14) of the programmable automatic system (13) consists of a sequence of geographical points (25) which the nautical apparatus (1) must successively follow.

* * * * *